United States Patent
Griesmeier

(10) Patent No.: US 7,341,610 B2
(45) Date of Patent: Mar. 11, 2008

(54) FUEL CELL SYSTEM HAVING TWO REFORMATION REACTORS AND METHOD FOR OPERATING SAME

(75) Inventor: Uwe Griesmeier, Markdorf (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 105 days.

(21) Appl. No.: 11/143,617

(22) Filed: Jun. 3, 2005

(65) Prior Publication Data

US 2005/0252082 A1    Nov. 17, 2005

Related U.S. Application Data

(62) Division of application No. 09/999,069, filed on Dec. 3, 2001, now abandoned.

(30) Foreign Application Priority Data

Dec. 1, 2000    (DE) ............... 100 59 674

(51) Int. Cl.
*C10J 3/46*    (2006.01)

(52) U.S. Cl. .......... 48/197 R; 48/198.7; 48/198.3; 48/127.5; 48/127.7; 422/187; 422/188; 422/189; 422/190; 422/207; 422/211; 422/222; 423/648.1; 423/650; 423/651; 429/12; 429/19

(58) Field of Classification Search .......... 48/197 R, 48/198.1, 198.7, 127.9, 61; 422/187–190, 422/207, 211, 222; 423/648.1, 650–651; 429/12, 19

See application file for complete search history.

(56) References Cited

U.S. PATENT DOCUMENTS 3,469,944 A * 9/1969 Bocard et al. .............. 423/650

5,800,798 A * 9/1998 Ino et al. .............. 423/654
5,928,614 A    7/1999 Autenrieth et al.
5,948,221 A    9/1999 Hsu
6,123,913 A    9/2000 Clawson et al.

FOREIGN PATENT DOCUMENTS

| DE | 196 24 435  | 8/1997  |
| DE | 19755116 C1 | 3/1999  |
| JP | 06104000 A  | 4/1994  |
| JP | 11273701 A  | 10/1999 |
| WO | WO 00/66487 | 11/2000 |

* cited by examiner

*Primary Examiner*—Alexa D. Neckel
*Assistant Examiner*—Kaity Handal
(74) *Attorney, Agent, or Firm*—Crowell & Moring LLP

(57) ABSTRACT

A fuel cell system includes a fuel cell unit and a gas-generating system containing at least one reforming unit for obtaining a hydrogen-rich reformate from a fuel. It is possible to supply the reformate at least partly to the anode side of the fuel cell unit. The system may include a first reforming reactor for producing a first reformate with a high outlet temperature; a second reforming reactor for producing a second reformate with a second outlet temperature which is below the first outlet temperature; a mixing element for mixing the first reformate with at least one fuel and located between an outlet of the first reforming reactor and an inlet of the second reforming reactor. The second reformate may be supplied to a gas-purification system and the purified reformate supplied to the fuel cell unit.

1 Claim, 2 Drawing Sheets

US 7,341,610 B2

FUEL CELL SYSTEM HAVING TWO REFORMATION REACTORS AND METHOD FOR OPERATING SAME

This application is a divisional of U.S. patent application Ser. No. 09/999,069, filed Dec. 3, 2001, abandoned, the disclosure of which is incorporated herein and which, in turn, claims the priority of German patent document 100 59 674.6 filed Dec. 1, 2000.

BACKGROUND AND SUMMARY OF INVENTION

The present invention relates to a fuel cell system and to a method for operating the fuel cell system.

DE 196 24 435 C1 (U.S. Pat. No. 5,928,614) discloses a reforming reactor that is used for the steam reforming of methanol. To stabilize the temperature of the different reactor steps, a heating device is provided for a middle step, while the steps at the inlet side and the outlet side are constructed as heat exchanges. During the methanol reforming reaction, carbon dioxide is formed, which must be removed from the reformate. In general, it is difficult to remove the waste heat developed during a customary, subsequent hydrogen gas shift reaction from the system in order to ensure a balance, thermal equilibrium that has sufficient dynamics.

Pursuant to the present invention, it is possible to work largely without heat exchange during the reforming and the subsequent gas purification. The reforming reactors can be constructed simply and compactly. The manufacturing costs of the reactors can thus be reduced. The system has fewer components and the pressure loss in the gas generating system is reduced.

It is advantageous that the methanol reforming system is very simple and therefore inexpensive. In the reforming region, heat exchangers are not required and, instead, adiabatic reactors can be used. The efficiency is good, especially in low-pressure systems. The system can, however, also be operated in the high-pressure range. A portion of the fuel may contain impurities, since these are broken down in the high-temperature adiabatic reactor. This leads to a savings in costs, since fuels of a lesser purity can be used.

It is to be understood that the aforementioned distinguishing features and those, which are still to be explained below, can be used not only in the combination given, but also in other combinations or by themselves, without leaving the scope of the present invention.

Other objects, advantages and novel features of the present invention will become apparent from the following detailed description of the present invention when considered in conjunction with the accompanying drawings.

DETAILED DESCRIPTION OF THE DRAWINGS

The present invention is suitable particularly for fuel cell systems that are used in mobile systems.

Figure 2:
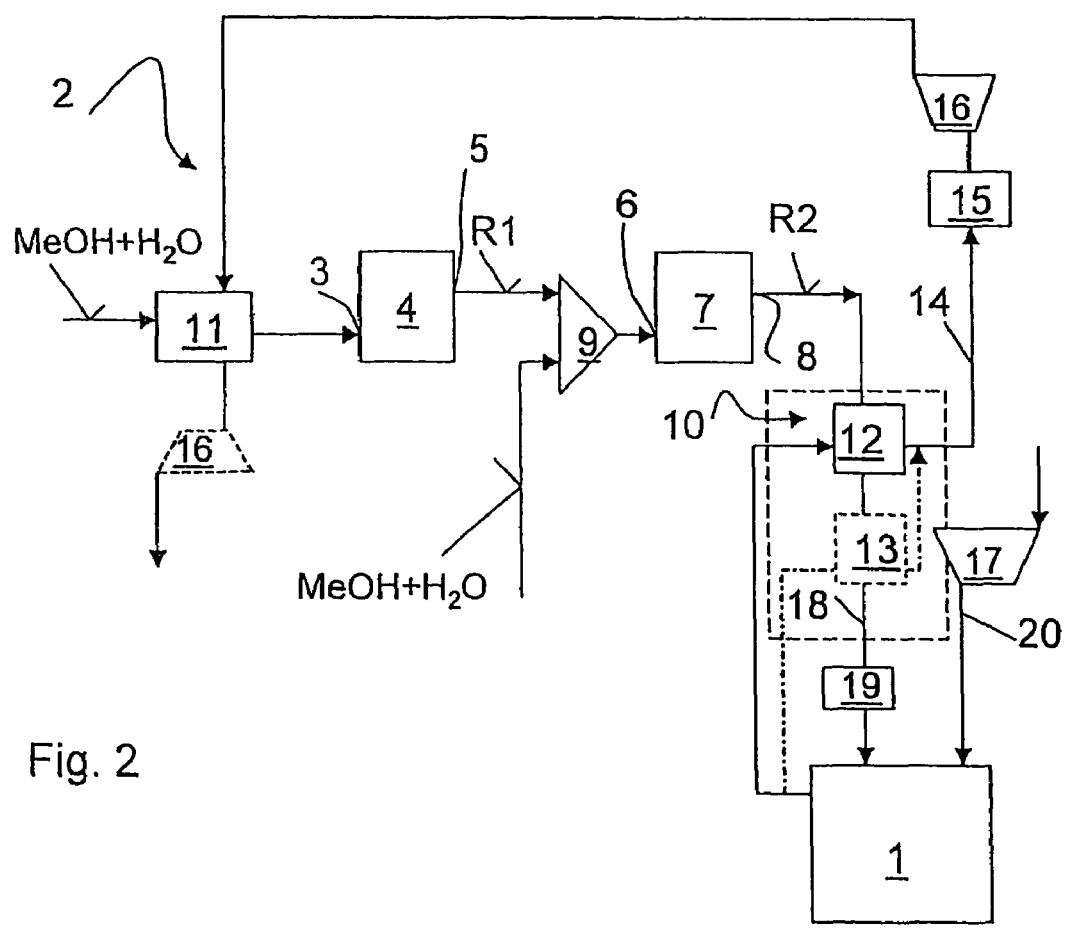
FIG. 2 shows a diagrammatic representation of a section from a fuel cell system according to the present invention.

In FIG. 2, a diagrammatic representation of an arrangement in a fuel cell system according to the present invention is shown. The fuel cell system has a fuel cell unit 1 and a gas generating system 2. In the gas generating system 2, hydrogen, for operating the fuel cell system, is obtained from a fuel, preferably an alcohol such as methanol or an ether, an ester, a hydrocarbon or the like. In a conventional gas generating system, at least one reforming unit is provided for attaining a hydrogen-rich reformate and the reformate can be supplied at least partly to the anode side of the fuel cell unit. Usually, the reformate is purified in a gas purifying system to remove undesirable constituents, such as carbon monoxide.

Figure 1:
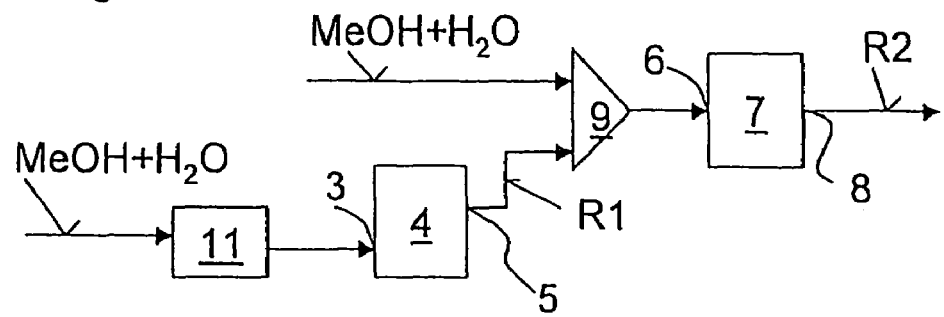
FIG. 1 shows a diagrammatic representation of a device with two reforming reactors according to one embodiment of the present invention.

As shown in FIG. 1, the fuel cell system has a first reforming reactor 4 for generating a first reformate $R_1$ and a second reforming reactor 7 for generating a second reformate R2. A first fuel, preferably a mixture of methanol and water as well as reaction air, is supplied to the inlet 3 of the first reforming reactor 4. Previously, the mixture is heated with the help of a heat exchanger 11 to a first inlet temperature $T_{1,\,in}$. Preferably, this first inlet temperature is between 200° and 300° C.

The catalyst-containing reforming reactor 4 may be an auto-thermal reactor with a catalyst, which preferably is not selective. The constituents supplied undergo reactions, which take place in accordance with thermodynamic equilibrium, in this reactor. In addition, the first reforming reactor 4 advisably has a catalyst that permits such reactions, preferably, a noble metal catalyst, such as platinum or a mixed catalyst, such as platinum/ruthenium. A reformate R1 is formed which is in thermodynamic equilibrium. The temperature of the first reformate R1 is appreciably above the first inlet temperature $T_{1,\,in}$. The first outlet temperature $T_{1,\,out}$ at the outlet 5 of the first reforming reactor 4 of 600° to 900° C. is high. An auto-thermal reactor is understood to be a reactor, which is operated adiabatically and in which steam reforming of the fuel takes place simultaneously with a partial oxidation at least of the fuel in the same reactor.

The fuel, which is supplied to the first reforming reactor 4, may also contain appreciable amounts of impurities, since the materials are decomposed reliably at the high temperature level, which is present.

The first reformate R1 is supplied to a second reforming reactor 7 for generating a second reformate $R_2$. For this purpose, the first reformate R1 is cooled to a lower temperature in an element 9, preferably a mixing element, which is between the outlet 5 of the first reforming reactor 4 and an inlet 6 of the second reforming reactor 7. This lower temperature corresponds to the second inlet temperature $T_{2,\,in}$ in the second reforming reactor 7. The second inlet temperature $T_{2,\,in}$ preferably is below the first outlet temperature $T_{1,\,out}$. For this purpose, a second fuel, preferably water and methanol, having a lower temperature $T_{MeOH}$, such as ambient temperature, is admixed in the mixing element 9. In so doing, the fuel or the mixture of fuels MeOH+$H_2$O is evaporated and the reformate R2 is cooled. The second inlet temperature $T_{2,\,in}$ preferably is between 200° and 500° C. The temperature can be adjusted by the amount of fuel, namely MeOH+$H_2$O, admixed with the first reformate R1.

Pursuant to the present invention, the second reforming reactor 7 is an adiabatic reactor. Such an adiabatic reactor is not cooled or heated externally, that is, additional heat is neither supplied from or discharged to the outside, with the exception of heat that is supplied to or discharged from the reforming reactor 7 by the media themselves, which are to be reacted, or of heat that is generated or consumed in the reactor by the reactions of the media, which are to be reacted. The second reforming reactor 7 has a catalyst that works selectively. In the second, adiabatic reforming reactor 7, two reactions take place, namely a steam reforming of the methanol and, simultaneously, a shift reaction, with which the carbon monoxide content in the medium is reduced. A copper-containing catalyst, such as Cu—Zn, is a preferred catalyst for the second reforming reactor 7.

The reformate R2, leaving at the outlet 8 of the second reforming reactor 7, has a second outlet temperature $T_{2,\,out}$, which is below the first outlet temperature $T_{1,\,out}$. Preferably, this temperature is between 150° and 250° C.

Subsequently, the second reformate R2 can be supplied to a gas purification system 10 and the reformate, purified there, can be supplied to the anode side of the fuel cell unit 1.

Preferably, the first inlet temperature $T_{1,\,in}$ is adjusted over the first heat exchanger 11, which is disposed upstream from the first reforming reactor 4, in that the medium is tempered there with waste gas from the fuel cell.

If the first and second reforming reactors 4, 7 are considered together, the different temperature levels are practically invisible from the outside. The exchange of the necessary reaction temperatures takes place within the reforming region. Moreover, the reforming reactors 4, 7 are not cooled directly and, instead, are operated adiabatically or auto-thermally. The first fuel enters the reforming region 4, 7 with a first inlet temperature $T_{1,\,in}$ of, for example, 250° C. and a reformate R2 leaves the reforming region 4, 7 as an end product with an, at most, only slightly lower outlet temperature $T_{2,\,out}$ of, for example, 200° C. The arrangement enables the reactor to be constructed very simply. The reforming reactors 4, 7 can be constructed, for example, as tubular reactors, which are filled with a catalyst.

In FIG. 2, a diagrammatic representation of a fuel cell system according to the present invention is shown. Comparable components have been given the reference numbers of FIG. 1.

Adjoining the reforming region with the reforming reactors 4, 7, there is a gas purification system 10, in which the reformate R2 is purified by the removal of undesirable residues of carbon monoxide. The gas-purification system 10 can be constructed as a one-step system and cooled with the waste gas from the anode and/or of the cathode of the fuel cell unit 1. The gas purification system 10 can, however, also be constructed as a two-step system, the first step 12 preferably being cooled with waste gas from the cathode and the second step 13 being cooled preferably with waste gas from the anode of the fuel cell unit 1. This is indicated by broken lines in FIG. 2. Preferably, selective oxidation of carbon monoxide takes place in the purification step.

The gas purification system 10, an afterburner 15, and downstream from the afterburner, the first heat exchanger 11 are disposed one after the other in the direction of flow in the waste gas from the fuel cell unit 1.

The system can be operated at a low pressure, such as 1 to 2 bar, or also at higher operating pressures. For high-pressure operation, it is advantageous to provide an expander 16 in the waste gas downstream from the afterburner. In a preferred arrangement, the expander 16 may be disposed between the after-burner 15 and the first heat exchanger 11. However, the temperature load on the expander 16 is high at this place. If a lower temperature load is desired, the expander can also be disposed downstream from the first heat exchanger 11.

The expander 16 may be coupled with a compressor 17 in an air supply 20 to the fuel cell unit 1.

A reformate cooling device 19, which can be cooled preferably by a cooling medium (not shown) of the fuel cell unit 1, may be disposed in the flowing reformate 18 downstream from the gas purification system 10.

Figure 3:
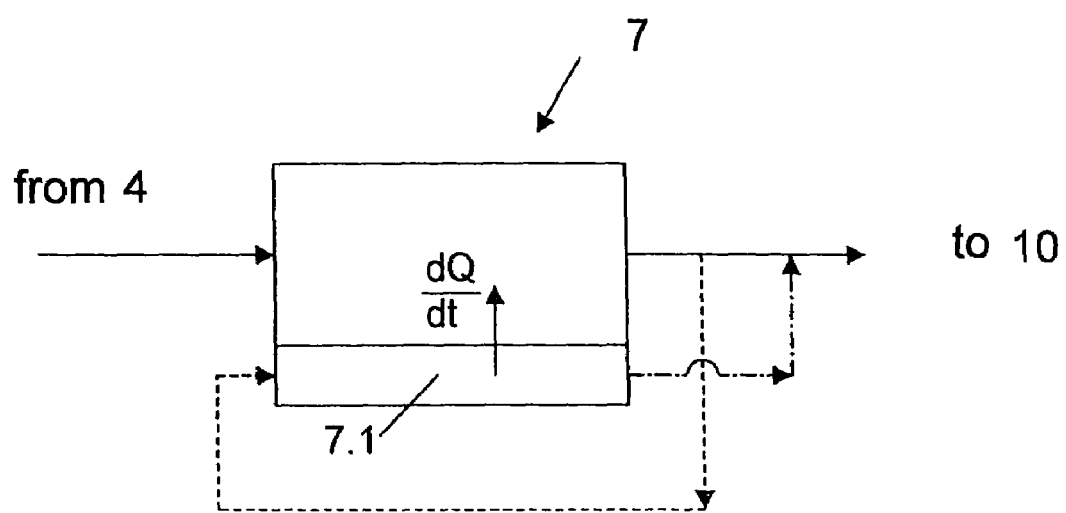
FIG. 3 shows a detail of the reactor arrangement for a cold starting case.

In the case of a cold start, it may be advantageous to supply additional air to the second reforming reactor 7. This is of benefit when the catalyst material in the second reforming reactor 7 is appropriately robust. It is also possible, in the case of a cold start, to pass waste gas from the second reforming reactor 7 in a region of the reactor 7, which is constructed as an internal heat exchanger 7.1 and in which this waste gas generates heat for heating the reactor 7 by the selective catalytic oxidation of hydrogen. This is shown in FIG. 3. Moreover, air is added only in this region 7.1 (not shown). The heat flux dQ/dt from the integrated, heat-generating starting step 7.1 into the actual reactor part of the reforming reactor 7 is indicated by an arrow. The first reformate R1 reaches the first reforming reactor 4 in the second reforming reactor 7. A portion of the reformate R2, which is formed there, is passed from a branch part into part 7.1 and oxidized there. The waste gas 7.1 can be supplied, preferably downstream from the branch part, to the second reformate R2.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for operating a fuel cell system, comprising:
   supplying at least one fuel with a first inlet temperature to a first reforming reactor;
   carrying out an auto-thermal reforming reaction in the first reforming reactor, wherein the reaction proceeds in thermodynamic equilibrium, thereby forming a first reformate with a first outlet temperature that is higher than the first inlet temperature;
   mixing the first reformate with a fuel having a lower temperature than the first outlet temperature, thereby forming a mixture having a second, lower inlet temperature; and
   supplying the mixture to a second reforming reactor in which, under adiabatic conditions, steam reforming and a hydrogen shift reaction take place, thereby producing a second reformate with a second outlet temperature that is below the first outlet temperature of the first reformate;
   wherein the fuel having a lower temperature than the first outlet temperature comprises methanol.

* * * * *